United States Patent
Kang et al.

(10) Patent No.: US 8,664,930 B2
(45) Date of Patent: Mar. 4, 2014

(54) METHOD OF STABILIZING WORK CONSUMPTION OF PASSIVE ELEMENT

(75) Inventors: Chin-Feng Kang, Hsin-Chu (TW); Jing-Chyi Wang, Hsin-Chu (TW)

(73) Assignee: Analog Integrations Corporation, Science Park, Hsin-Chu (TW)

( * ) Notice: Subject to any disclaimer, the term of this patent is extended or adjusted under 35 U.S.C. 154(b) by 621 days.

(21) Appl. No.: 12/942,030

(22) Filed: Nov. 9, 2010

(65) Prior Publication Data

US 2012/0062142 A1 Mar. 15, 2012

(30) Foreign Application Priority Data

Sep. 15, 2010 (TW) ................................ 99131210 A

(51) Int. Cl.
G05F 5/00 (2006.01)
G05F 1/00 (2006.01)
H05B 37/02 (2006.01)
H05B 41/36 (2006.01)
H05B 39/04 (2006.01)

(52) U.S. Cl.
USPC .......................................... 323/299; 315/291

(58) Field of Classification Search
USPC ......................................................... 315/299
See application file for complete search history.

(56) References Cited

U.S. PATENT DOCUMENTS

2012/0098463 A1 * 4/2012 Stamm et al. ................. 315/307

FOREIGN PATENT DOCUMENTS

| CN | 201248164 Y | 5/2009 |
| JP | 2006351473 A | 12/2006 |
| JP | 200860604 A | 3/2008 |

OTHER PUBLICATIONS

Zhang Long-Guo, Integration Design of Input Current Shaping-Based Single-Stage AC/DC Converters and the Application on Electronic Ballast for Gas Discharge Lamps, National Science Council research report, P1~P8, Nov. 4, 2005.

* cited by examiner

*Primary Examiner* — Douglas W Owens
*Assistant Examiner* — Dedei K Hammond
(74) *Attorney, Agent, or Firm* — Winston Hsu; Scott Margo

(57) ABSTRACT

While an electronic product including passive elements is connected to an AC input voltage source, corresponding decreased currents are calculated according to a constant input/output work and a voltage curve of the input voltage source. Therefore, while the electronic product is activated under voltage sources having different scales or being unstable, the calculated decreased currents are applied so as to stabilize the input work or the output work.

11 Claims, 4 Drawing Sheets

METHOD OF STABILIZING WORK CONSUMPTION OF PASSIVE ELEMENT

BACKGROUND OF THE INVENTION

1. Field of the Invention

The present invention relates to a method applied for an AC power source having a time-variant voltage level so as to stabilize work consumption of a passive element, and more particularly, to a method of stabilizing work consumption of a passive element by adjusting an input current provided to the passive element.

2. Description of the Prior Art

While an electronic product including passive elements is connected to a household AC power source, operations of the electronic product are easily affected by an unstable voltage level of the AC power source. While the electronic product includes light emitting diodes as its passive elements, since the light emitting diodes merely work under a condition that the voltage level of the AC power source is higher than a switch-on voltage of the light emitting diodes, stability of the light emitting diodes is significantly depending on stability of the AC power source.

Please refer to FIG. 1 and FIG. 2. FIG. 1 illustrates curve diagrams respectively indicating an input voltage/an input current/an input power of the light emitting diodes utilized by a conventional electronic product utilizing a household AC power source. FIG. 2 illustrates corresponding diagrams of FIG. 1 while the input voltage indicated at FIG. 1 varies.

As can be observed in an input voltage curve ac1 and an input current curve illustrated in FIG. 1, merely when the input voltage indicated by the input voltage curve ac1 is higher than a switch-on voltage VLED_ON of the light emitting diodes, the input current of the light emitting diodes is raised from zero to a constant current magnitude I_LED. Within the duration when the voltage level of the input voltage curve ac1 is higher than the switch-on voltage VLED_ON, i.e., the duration between the moments t1 and t2 shown in FIG. 1, consumption work of an input power source providing the input voltage equals to an area enveloped by an input power curve PC1 and a time difference between the moments t1 and t2, as shown by the italic line region in FIG. 1, where the input power curve PC1 is determined by the AC voltage ac1 and a line indicated the constant current magnitude I_LED. Note that a light-emitting output power P equals the switch-on voltage VLED_ON multiplied by the constant current I_LED. FIG. 2 illustrates a condition that the input voltage curve varies from ac1 to ac2 because of raise of an unstable input voltage of the light emitting diode, such as an AC voltage source. At this time, a duration, when the input voltage indicated by the input voltage curve ac2 is higher than the switch-on voltage VLED_ON, is lengthen from (t1−Δt) to (t2+Δt), where Δt indicates an negligible duration in comparison to (t2−t1). As can be observed from the area enveloped by the time difference (t2−t1) and the power curve PC1, and from the area enveloped by the time difference (t2+Δt)−t1−Δt) and the power curve PC2, the input work done by the input voltage source is increased and may be indicated by an enveloped area difference between enveloped area of the power curves PC1 and PC2, or may be indicated by a current-by-time raise equal to I_LED*2Δt; the enveloped area difference between the power curves PC1 and PC2 indicates an increased work because of the unstable input voltage, i.e., the area carrying upward arrows shown in FIG. 2. If the difference between the input voltage curves ac1 and ac2 is getting larger, the increased work from the input voltage source will render the luminance of the light emitting diode to be more unstable.

SUMMARY OF THE INVENTION

The claimed invention discloses a method of stabilizing work consumption of a passive element. The method comprises adjusting an input current provided by an AC power source, according to an input work provided by the AC power source and a voltage level of an input voltage from the AC power source, so as to render the input work substantially constant, while the voltage level of the input voltage is changed from lower than a predetermined voltage to higher than the predetermined voltage. The input voltage, the input current, and the input work are inputted to a passive element by the AC power source.

The claimed invention also discloses a method of stabilizing work consumption of a passive element. The method comprises adjusting an input current provided by an AC power source, according to an output work outputted by a passive element and a voltage level of an input voltage from the AC power source, so as to render the output work substantially constant, while the voltage level of the input voltage is changed from lower than a predetermined voltage to higher than the predetermined voltage. The input voltage and the input current are inputted to the passive element by the AC power source.

These and other objectives of the present invention will no doubt become obvious to those of ordinary skill in the art after reading the following detailed description of the preferred embodiment that is illustrated in the various figures and drawings.

DETAILED DESCRIPTION

The present invention discloses a method of stabilizing work consumption of passive elements from an input voltage source, by adjusting an input current according to an input voltage. With the aid of the disclosed method, unstable luminance of light emitting diodes serving as passive elements caused by an unstable input voltage, such as an AC voltage source, is thereby neutralized.

There are at least two embodiments disclosed in the present invention. In a first embodiment, under a condition that input work consumption from an input voltage source is kept stable, a magnitude of an input current from the input voltage source is continuously adjusted according to a time-variant input voltage from the input voltage source. In a second embodiment of the present invention, under a condition that output work consumption of the passive element is kept stable, the magnitude of the input current from the input voltage source is continuously adjusted, according to the time-variant input voltage from the input voltage source. Note that the adjustment of the magnitude of the input current may indicate reduction of said magnitude of the input current. The adjusted magnitude of the input current is determined in a test procedure of an electronic product including the passive elements, and details of calculating the adjustment are going to be described later.

Figure 1:
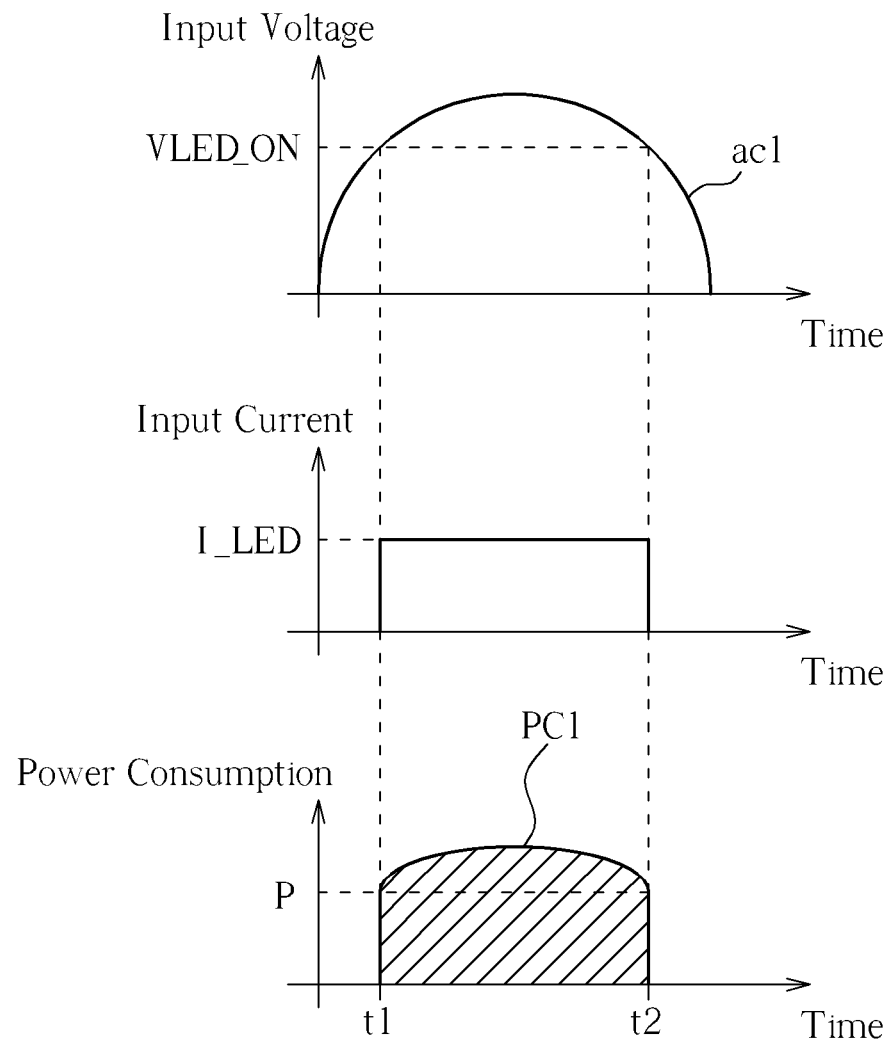
FIG. 1 illustrates curve diagrams respectively indicating an input voltage/an input current/an input power of the light emitting diodes utilized by a conventional electronic product utilizing a household AC power source.
Figure 3:
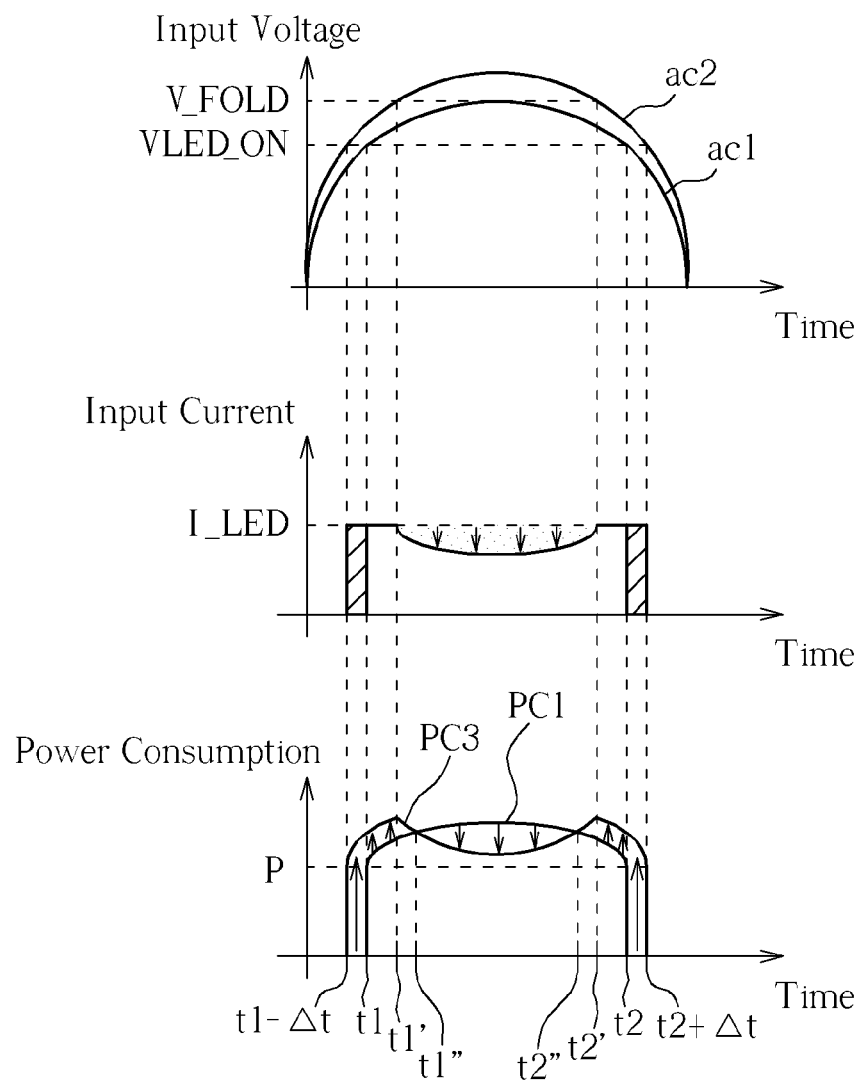
FIG. 3 illustrates a schematic diagram of adjusting the magnitude of the input current for stabilizing input work consumption of passive elements from the input voltage source according to a preferred embodiment of the present invention.

Please refer to FIG. 3, which illustrates a schematic diagram of adjusting the magnitude of the input current for stabilizing input work consumption of passive elements from the input voltage source according to a preferred embodiment of the present invention. In FIG. 3, a constant critical voltage V_FOLD higher than the switch-on voltage VLED_ON is set, where how to set the critical voltage V_FOLD will be described later. The primary difference between the first and second embodiments lies in an amount of the adjustment of the input current while the input voltage is higher than the critical voltage V_FOLD, therefore, the following descriptions refer to both the first and second embodiments of the present invention. FIG. 3 also illustrates the input voltage curve ac1 shown in FIG. 1 as a reference. As can be observed from FIG. 3, while the input voltage curve is substantially changed from ac1 to ac2, and when a voltage level of the input voltage curve ac2 is higher than the critical voltage V_FOLD, the magnitude of the input current is reduced so as to stabilize the input/output work consumption, according to the present invention.

Figure 2:
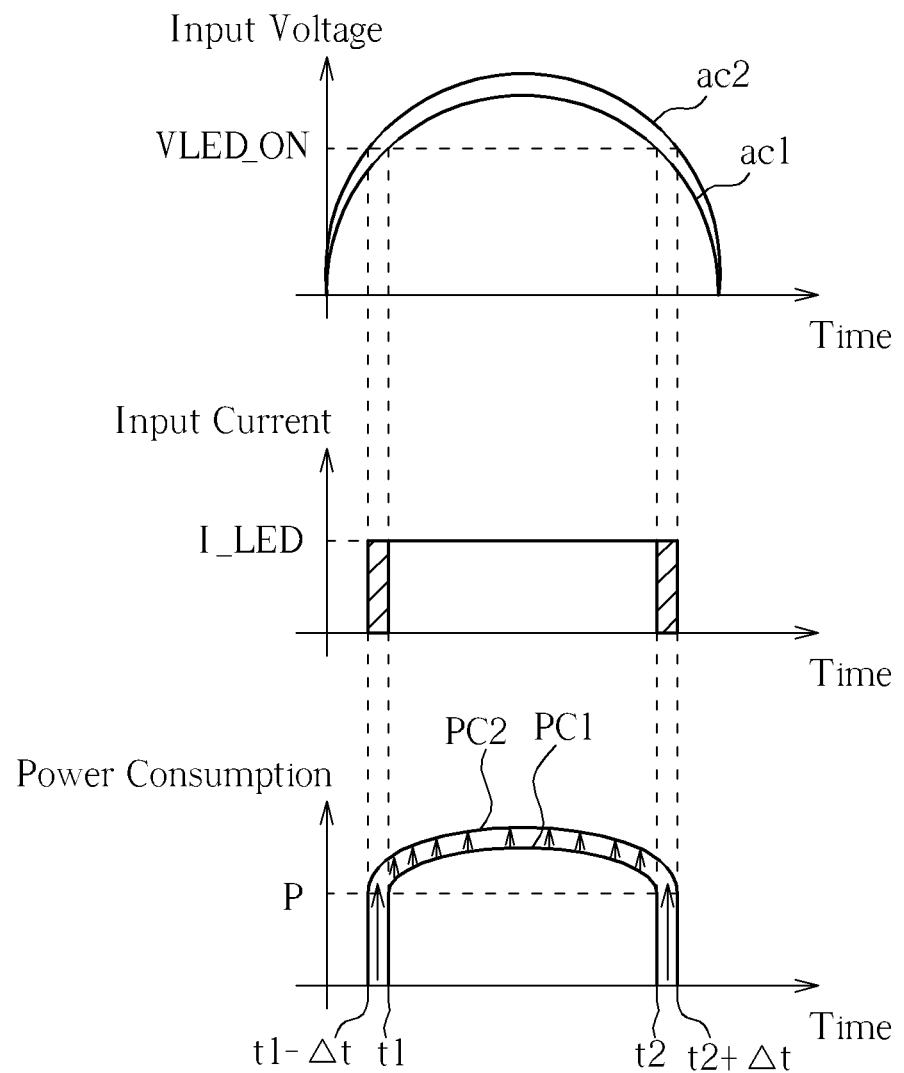
FIG. 2 illustrates corresponding diagrams of FIG. 1 while the input voltage indicated at FIG. 1 varies.

Between the moments t1 and t2, the work consumption generated from the input voltage curve ac1 is originally indicated by the area enveloped by the power curve PC1 and a variation from the moment t1 to the moment t2. However, the actual input voltage curve is changed from ac1 to ac2 because of the unstable input voltage; for compensating the increased area caused by the change from the input voltage curve ac1 to the input voltage curve ac2, the input current from the moment t1' to the moment t2', i.e., a duration when the voltage level of the input voltage curve ac2 is higher than the critical voltage V_FOLD, is reduced, and as a result, the actual power curve is changed from the power curve PC2 shown in FIG. 2 to the power curve PC3 shown in FIG. 3. The power curve PC3 is identical with the power curve PC2 between the moments t1−Δt and t1', and between the moments t2' and t2+αt. In other words, assume that original work done by the input voltage source, which originally acquires the input voltage curve ac1 between the moment t1 and t2, equals to $$\int_{t1}^{t2} PC1 * dt,$$

and assume that after-work done by the input voltage source, which acquires the input voltage curve ac2 between the moments t1−Δt and t2+Δt instead of the input voltage curve ac1, equals to $$\int_{t1-\Delta t}^{t2+\Delta t} PC3 * dt.$$

Therefore, for rendering the input work down by the input voltage source to be continuously constant in the first embodiment of the present invention, a condition has to be followed as follows:

$$\int_{t1}^{t2} PC1 * dt = \int_{t1-\Delta t}^{t2+\Delta t} PC3 * dt \qquad (1)$$

In aspects of work increased between the moments t1−Δt and t1' and between the moments t2" and t2+Δt, which is indicated by an area filled with upward arrows, and in aspects of work reduced between the moments t1" and t2" introduced by reducing the magnitude of the input current, where the moments t1" and t2" indicate intersections between the power curves PC1 and PC3, the moment t1" is later than the moment t1', and the moment t2" is earlier than the moment t2', the equation (1) may be inducted as follows:

$$\int_{t1-\Delta t}^{t1''} (PC3 - PC1) * dt + \int_{t2''}^{t2+\Delta t} (PC3 - PC1) = \int_{t1''}^{t2''} (PC1 - PC3) * dt \qquad (2)$$

The left side of the equation (2) indicates the increased work down by the input voltage source while the substantial input voltage curve is changed from ac1 to ac2, and the right side of the equation (2) indicates the reduced work introduced by the reduced input current. While the equation (2) stands, the input work done by the input voltage source between the moments t1−Δt and t2+Δt equals to the input work introduced by the power curve PC1 shown in FIG. 1 between the moments t1 and t2, so that a constant total input work is reached. For reaching the constant total input work, the magnitude of the reduced input current between the moments t1' and t2' has to be calculated according to equation (1) or equation (2). Since the power curve PC1 is determined according to the input voltage curve ac1 and the constant current I_LED, and since the power curve PC3 is determined according to the input voltage curve ac2 and the adjusted (or reduced), as long as values of the input voltage curves ac1 and ac2 between the moments t1−Δt and t2+Δt are known, the magnitude of the reduced input current can be calculated at any moments between the moments t1' and t2' shown in FIG. 3 with the aid of the known current I_LED and both the equations (1) and (2). Note that the known values of both the input voltage curve ac1 and ac2 may be set to different sinusoidal voltage sources while testing the electronic product including the passive elements.

Figure 4:
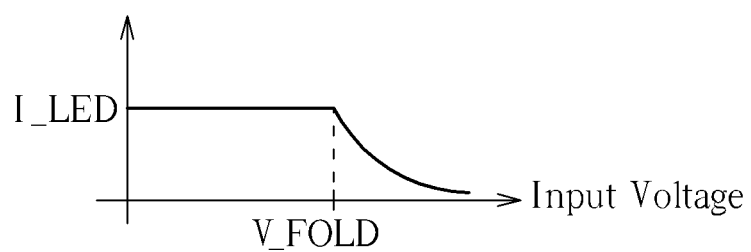
FIG. 4 schematically illustrates a calculated input current curve corresponding to a fixed value of a critical voltage after accomplishing the adjustment of the input current shown in FIG. 3, while the electronic product including the passive elements is tested.

The setting of the critical voltage V_FOLD shown in FIG. 3 is also accomplished during the resting procedure of the electronic product. For example, the fabricator of the electronic product is able to determine different magnitudes of the reduced input current, corresponding to different constant value of the critical voltage V_FOLD. Please refer to FIG. 4, which schematically illustrates a calculated input current curve corresponding to a fixed value of the critical voltage V_FOLD after accomplishing the adjustment of the input current shown in FIG. 3, while the electronic product including the passive elements is tested. As shown in FIG. 4, after setting a fixed value of the critical voltage V_FOLD, before the input voltage is higher than the set critical voltage V_FOLD, the magnitude of the input current is kept at I_LED. However, after the input voltage is higher than the set critical voltage V_FOLD, the magnitude of the input current begins falling, and an amount of the reduction of the input current is calculated according to the condition of constant input work from the input voltage or constant output work from the passive elements, i.e., according to equation (1) or (2). Therefore, while testing the electronic product, or even testing the included passive elements, different values of the critical voltage V_FOLD can be set, so as to determine different input current curve corresponding to the different values of the input current. While a user uses the tested electronic product, the electronic product detects the input voltage. When the input voltage is detected to be higher than the set critical voltage V_FOLD, the input current curve shown in FIG. 4 is utilized for adjusting the magnitude of the input current, so as to stabilize the input/output work consumed on the electronic product. While the included passive elements are light emitting diodes, in the first embodiment of the present invention for stabilizing the input work from the input voltage source, the value of the critical voltage V_FOLD may directly be utilized for determining different input current curves. In the second embodiment of the present invention for stabilizing the output work produced from the passive elements, i.e., light emitting diodes, since the switch-on voltage of the light emitting diodes is constant, the value of the critical voltage V_FOLD may directly set to be equal to the switch-on voltage of the light emitting diodes; therefore, the area enveloped by the power curve PC1 between the moments t1 and t2 directly indicates the output work produced by the light emitting diodes, and the input current curve is determined according to the set critical voltage V_FOLD, i.e., the switch-on voltage of the light emitting diodes, under the condition that the output work from the light emitting diodes is constant and stable. Therefore, no matter the purpose is for stabilizing the input work from the input voltage source or the output work from the light emitting diodes, the luminance of the light emitting diodes can still be kept stable.

Besides light emitting diodes, the passive elements indicated in the present invention may also be passive elements having different specifications, such as resistors. Therefore, utilizing the disclosed method of the present invention on passive elements other than light emitting diodes still forms embodiments of the present invention.

The present invention discloses a method of stabilizing work consumption of passive elements. The disclosed method calculates a reducing amount of an input current, according to constant input/output work and an input voltage curve. Therefore, an electronic including passive element is capable of utilizing different reduced input currents for handling input voltage sources having different specifications or being unstable, such as an AC voltage source; therefore, even if the electronic product is connected to an unstable input voltage source, the aim of stabilizing the input/output work consumption can be fulfilled.

Those skilled in the art will readily observe that numerous modifications and alterations of the device and method may be made while retaining the teachings of the invention.

What is claimed is:

1. A method of stabilizing work consumption of a passive element, comprising:
    decreasing an input current provided by an AC power source, according to an input work provided by the AC power source and a voltage level of an input voltage from the AC power source, so as to render the input work substantially constant, when the voltage level of the input voltage is changed from less than a critical voltage level to greater than the critical voltage level; and
    maintaining the input current to be about a constant current when the voltage level of the input voltage is less than the critical voltage level;
    wherein the input voltage, the input current, and the input work are inputted to a passive element by the AC power source, and the critical voltage level is greater than or equal to a switch-on voltage level of the passive element.

2. The method of claim 1, wherein decreasing the input current comprises:
    calculating an reduction amount of the input current according to the input work and the voltage level of the input voltage.

3. The method of claim 1, wherein the passive element is a resistor or a light-emitting diode.

4. A method of stabilizing work consumption of a passive element, comprising:
    decreasing an input current provided by an AC power source, according to an output work outputted by a passive element and a voltage level of an input voltage from the AC power source, so as to render the output work substantially constant, when the voltage level of the input voltage is changed from less than a critical voltage level to greater than the critical voltage level; and
    maintaining the input current to be about a constant current when the voltage level of the input voltage is less than the critical voltage level;
    wherein the input voltage and the input current are inputted to the passive element by the AC power source, and the critical voltage level is greater than or equal to a switch-on voltage level of the passive element.

5. The method of claim 4, wherein decreasing the input current comprises:
    calculating an reduction amount of the input current according to the output work and the voltage level of the input voltage.

6. The method of claim 4, wherein the passive element is a resistor or a light-emitting diode.

7. A method of stabilizing work consumption of a passive element, comprising:
    comparing a voltage level of an input voltage from an AC power source with a critical voltage level;
    measuring an input current provided by the AC power source;
    maintaining the input current to be about a constant current when the voltage level of the input voltage is less than the critical voltage level; and
    decreasing the input current when the voltage level of the input voltage is greater than the critical voltage level;
    wherein the input current is inputted to a passive element by the AC power source, and the critical voltage level is greater than or equal to a switch-on voltage level of the passive element.

8. The method of claim 7, wherein the critical voltage level is greater than the switch-on voltage level of the passive element.

9. The method of claim 7, wherein the critical voltage level is equal to the switch-on voltage level of the passive element.

10. The method of claim 1, wherein the passive element is a resistor.

11. The method of claim 1, wherein the passive element is a light-emitting diode.

* * * * *